US009249681B2

(12) United States Patent
Robertson, Jr. et al.

(10) Patent No.: US 9,249,681 B2
(45) Date of Patent: Feb. 2, 2016

(54) FAN CASE RUB SYSTEM

(75) Inventors: Thomas J. Robertson, Jr., Glastonbury, CT (US); Scot A. Webb, Gales Ferry, CT (US); Steven C. Clarkson, Cheshire, CT (US)

(73) Assignee: United Technologies Corporation, Hartford, CT (US)

( * ) Notice: Subject to any disclaimer, the term of this patent is extended or adjusted under 35 U.S.C. 154(b) by 1039 days.

(21) Appl. No.: 13/361,990

(22) Filed: Jan. 31, 2012

(65) Prior Publication Data

US 2013/0195635 A1 Aug. 1, 2013

(51) Int. Cl.
*F01D 11/16* (2006.01)
*F01D 21/04* (2006.01)
*F01D 11/12* (2006.01)
*F02K 3/06* (2006.01)

(52) U.S. Cl.
CPC .............. *F01D 11/16* (2013.01); *F01D 11/122* (2013.01); *F01D 11/127* (2013.01); *F01D 21/045* (2013.01); *F02K 3/06* (2013.01); *Y02T 50/672* (2013.01)

(58) Field of Classification Search
CPC .... F05D 2240/14; F01D 11/127; F01D 25/24
USPC ......................................... 415/128, 196, 197
See application file for complete search history.

(56) References Cited

U.S. PATENT DOCUMENTS

| 2,994,472 | A |   | 8/1961  | Botje |
|-----------|---|---|---------|-------|
| 3,104,091 | A | * | 9/1963  | Vivian ........................... 415/190 |
| 4,251,185 | A |   | 2/1981  | Karstensen |
| 4,307,993 | A | * | 12/1981 | Hartel ............................ 415/116 |
| 4,662,658 | A | * | 5/1987  | Holowach et al. ....... 285/148.26 |
| 4,785,623 | A | * | 11/1988 | Reynolds ......................... 60/796 |
| 4,786,232 | A |   | 11/1988 | Davis et al. |
| 5,080,557 | A | * | 1/1992  | Berger ........................ 415/173.3 |
| 5,160,248 | A |   | 11/1992 | Clarke |
| 5,201,887 | A |   | 4/1993  | Bruchez, Jr. et al. |
| 5,233,822 | A | * | 8/1993  | Ward et al. ...................... 60/772 |
| 5,291,732 | A | * | 3/1994  | Halila .............................. 60/796 |
| 5,318,402 | A |   | 6/1994  | Bailey et al. |
| 5,320,486 | A |   | 6/1994  | Walker et al. |

(Continued)

FOREIGN PATENT DOCUMENTS

| JP | 2001-241397 A | 9/2001 |
| JP | 2009-515075 A | 4/2009 |

(Continued)

OTHER PUBLICATIONS

Gunston, Bill, Editor, "Pratt & Whitney PW8000" Jane's Aero-Engines, Mar. 2000, pp. 510-512, Issue Seven, Janes Information Group Limited, Coulsdon, United Kingdom.

(Continued)

*Primary Examiner* — Sean J Younger
(74) *Attorney, Agent, or Firm* — Bachman & LaPointe, P.C.

(57) ABSTRACT

A turbine engine fan case assembly includes a structural case and a liner assembly. A radially accommodating attachment system connects the liner assembly to the structural case. The attachment system comprises a circumferentially-distributed plurality of longitudinally elongate radially outwardly open channels mounted to the liner assembly. The attachment system further comprises an associated plurality of inwardly-projecting tongues mounted to the structural case. Each tongue is accommodated in an associated such channel.

12 Claims, 4 Drawing Sheets

(56) References Cited

U.S. PATENT DOCUMENTS

| | | | |
|---|---|---|---|
| 6,227,794 | B1 | 5/2001 | Wojtyczka et al. |
| 6,364,603 | B1 | 4/2002 | Czachor et al. |
| 6,382,905 | B1 | 5/2002 | Czachor et al. |
| 6,637,186 | B1 | 10/2003 | Van Duyn |
| 6,910,853 | B2 * | 6/2005 | Corman et al. ............... 415/136 |
| 6,935,836 | B2 | 8/2005 | Ress, Jr. et al. |
| 7,241,108 | B2 | 7/2007 | Lewis |
| 7,390,161 | B2 * | 6/2008 | Xie et al. ........................... 415/9 |
| 7,402,022 | B2 | 7/2008 | Harper et al. |
| 7,694,505 | B2 | 4/2010 | Schilling |
| 7,797,809 | B2 | 9/2010 | Costa et al. |
| 7,866,939 | B2 | 1/2011 | Harper et al. |
| 7,914,251 | B2 | 3/2011 | Pool et al. |
| 8,016,543 | B2 * | 9/2011 | Braley et al. ..................... 415/9 |
| 8,231,328 | B2 | 7/2012 | Reed |
| 2008/0115339 | A1 * | 5/2008 | Blanton et al. .................. 29/284 |
| 2009/0056343 | A1 | 3/2009 | Suciu et al. |
| 2009/0155065 | A1 * | 6/2009 | Xie et al. ....................... 415/200 |
| 2010/0111675 | A1 | 5/2010 | Wojtyczka et al. |
| 2011/0037233 | A1 * | 2/2011 | Harper .......................... 277/551 |
| 2011/0044806 | A1 * | 2/2011 | Harper ....................... 415/182.1 |
| 2011/0044807 | A1 | 2/2011 | Bottome |
| 2011/0052383 | A1 * | 3/2011 | Lussier ......................... 415/200 |
| 2011/0123326 | A1 | 5/2011 | DiBenedetto et al. |

FOREIGN PATENT DOCUMENTS

| | | |
|---|---|---|
| JP | 2010-031871 A | 2/2010 |
| WO | 2007-035184 A2 | 3/2007 |

OTHER PUBLICATIONS

Japanese Office Action for JP Patent Application No. 2013-012762, dated Jan. 7, 2014.
Japanese Office Action for JP Patent Application No. 2013-042483, dated Feb. 18, 2014.
GE Aviation, The GE90 Engine, General Electric, 2014.
GE90-94B Engine Logs More than 10 Million Flight Hours, Deagel.com, article from Apr. 1, 2008.
U.S. Office action for U.S. Appl. No. 13/362,654, dated Jan. 15, 2015.

* cited by examiner

FAN CASE RUB SYSTEM

BACKGROUND

The disclosure relates to gas turbine engines. More particularly, the disclosure relates to fan tip clearance accommodation.

In turbofan engines, differences in the fan material versus fan case material may contribute to thermally-induced rub.

SUMMARY

One aspect of the disclosure involves a turbine engine fan case assembly. This includes a structural case and a liner assembly. A radially accommodating attachment system connects the liner assembly to the structural case. The attachment system comprises a circumferentially-distributed plurality of longitudinally elongate radially outwardly open channels mounted to the liner assembly. The attachment system further comprises an associated plurality of inwardly-projecting tongues mounted to the structural case. Each tongue is accommodated in an associated said channel.

Other aspects involve such a system alone and its components including the channels and tongues and their pairings. Thus, in additional or alternative embodiments of any of the foregoing embodiments: the tongues are of tongue members each comprising a T sectioned rail, the arms of the T forming a flange mounted to the structural case, and the leg of the T forming the tongue; and the channels are formed by a member having, in cross section, a channel base, a pair of sidewalls extending radially outward from opposite sides of the base and a pair of mounting flanges extending circumferentially outward from radially outboard edges of the sidewalls. In additional or alternative embodiments of any of the foregoing embodiments: each T-sectioned rail is a non metallic rail; and the member is a non metallic member.

In additional or alternative embodiments of any of the foregoing embodiments: the non-metallic rail comprises injection molded thermoplastic; and the non-metallic member comprises injection molded thermoplastic.

In additional or alternative embodiments of any of the foregoing embodiments: the channels extend within a honeycomb material. In additional or alternative embodiments of any of the foregoing embodiments: there are 4-10 of said channels and tongues. In additional or alternative embodiments of any of the foregoing embodiments: the channels have a fore to aft depth increase. In additional or alternative embodiments of any of the foregoing embodiments: the tongues are a molded or extruded plastic; and the channels are a molded or extruded plastic.

In additional or alternative embodiments of any of the foregoing embodiments: the structural case comprises a non-metallic member principally dictating thermal expansion of the structural case; and the liner assembly comprises a metallic member principally dictating thermal expansion of the liner assembly. In additional or alternative embodiments of any of the foregoing embodiments, the non-metallic member may comprise a carbon fiber member.

In a further aspect, a turbine engine may comprise a fan case assembly of any of the foregoing embodiments and a fan encircled by the fan case. In additional or alternative embodiments of any of the foregoing embodiments: the structural case comprises a non metallic member principally dictating thermal expansion of the structural case; the liner assembly comprises a metallic member principally dictating thermal expansion of the liner assembly; and the liner assembly metallic member has a coefficient of thermal expansion within 5% of a coefficient of thermal expansion of blades of the fan.

In additional or alternative embodiments of any of the foregoing embodiments: a longitudinally elongate radially outwardly open channel for mounting to a liner assembly; and an associated inwardly projecting tongue for mounting to the structural case, and dimensioned to be accommodated in said channel.

Another aspect of the disclosure involves a fan case liner attachment system. A longitudinally elongate radially outwardly open channel is provided for mounting to a liner assembly. An associated inwardly projecting tongue is provided for mounting a structural case and is dimensioned to be accommodated in said channel.

In additional or alternative embodiments of any of the foregoing embodiments, the inwardly projecting tongue is formed by the leg of a T-sectioned member. In additional or alternative embodiments of any of the foregoing embodiments, the outwardly open channel is formed having a U-shaped cross-section further comprising a pair of circumferentially outwardly extending segments.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
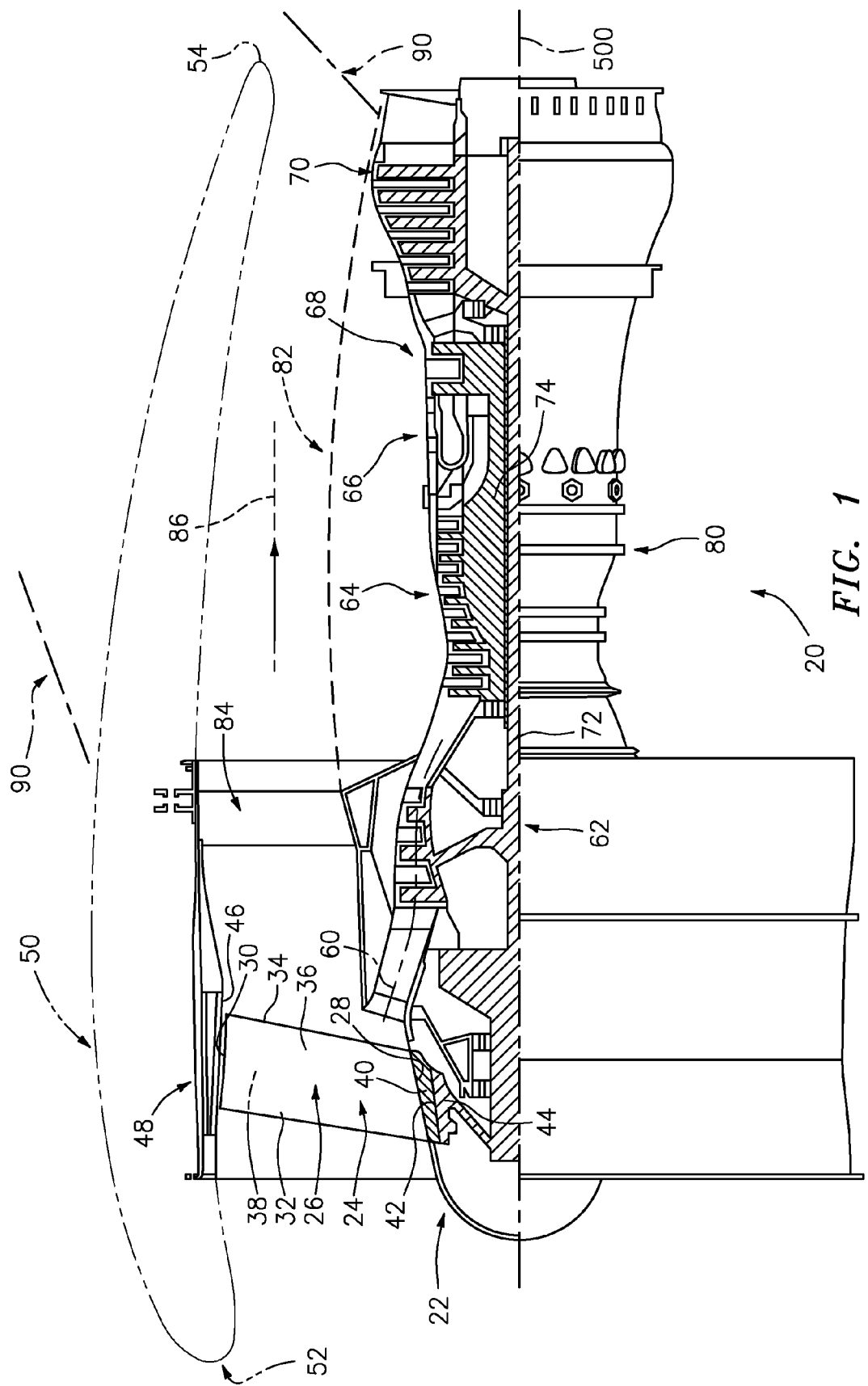
FIG. 1 is an axial sectional view of a turbofan engine.

FIG. 1 shows a turbofan engine 20 having a centerline or central longitudinal axis 500. The engine includes a fan 22 at a forward/upstream end of the engine. The fan 22 has a circumferential array of fan blades 24. The exemplary blades 24 each have an airfoil 26 extending from a proximal end 28 to a distal end or tip 30. Each blade airfoil extends from a leading-edge 32 to a trailing edge 34 and has pressure side 36 and a suction side 38. Inboard of the airfoil, each blade may include an attachment root 40 mounted in a complementary feature (e.g., a slot) 42 of a fan hub 44. The blade tips 30 are in close facing proximity to the inner/inboard surface 46 of a fan case 48. The exemplary fan case 48 is within an aerodynamic fan nacelle 50. The nacelle 50 extends from an upstream end/rim 52 to a downstream end/rim 54.

Downstream of the fan along a core flowpath 60 are, sequentially, one or more compressor sections 62, 64, a combustor section 66, and one or more turbine sections 68, 70. In the exemplary engine, there are two compressor sections and two turbine sections. The low pressure compressor section 62 is coupled to the low pressure turbine section 70 via a shaft 72. Similarly, the high pressure compressor section 64 is coupled to the high pressure turbine section 68 via a shaft 74. Driven by the respective turbine sections, the compressor sections sequentially compress a core flow of air received from the fan and deliver the compressed air to the combustor where the compressed air is mixed with fuel and combusted to generate high pressure combustion gases. These gases are sequentially expanded in the turbine sections to, in turn, drive the compressor sections. Each of the compressor sections and turbine sections may include one or more stages of blades interspersed with stages of vanes. The fan may be driven directly or indirectly by one of the turbine sections. For example, the fan may be coupled to the shaft 72 by a transmission so that the fan rotates about the centerline at a slower speed than does the shaft 72.

The core flowpath passes through an engine case 80. The engine case may be within an aerodynamic nacelle 82. Bearing systems may support the shafts and fan relative to the engine case for rotation about the centerline 500. A circumferential array of struts 84 may position the fan case relative to the engine case. The exemplary struts 84 are aft/downstream of the fan and extend across a bypass flowpath 86 outboard of the core flowpath.

To mount the engine to an aircraft, a pylon 90 may have a proximal end (not shown) mounted to the aircraft fuselage or wing. A distal end of the pylon may mount to the engine. The exemplary mounting involves connection to both the fan case and the engine case.

The fan blades are subject to radial expansion due to inertial forces associated with fan rotation (centrifugal loading). The fan blades are also subject to thermal expansion which is influenced by the material properties of the fan blades (e.g., the coefficient of thermal expansion (CTE)). The fan case is also subject to thermal expansion. In operation, there typically is a gap or clearance between the fan blade tips and the adjacent inboard surface portion of the fan case. On the one hand, it is desirable to keep this gap small to maintain engine efficiency. On the other hand, it is generally desirable to avoid having this gap fully close which produces rub.

A radial accomodation of the liner may minimize variation of the fan blade tip clearance during engine operation. The accomodation matches the thermal expansion of the liner to the blade material, independent of the thermal expansion of the containment case, thereby allowing an optimal selection of material properties of both the fan and case to minimize weight and maximize performance.

Figure 2:
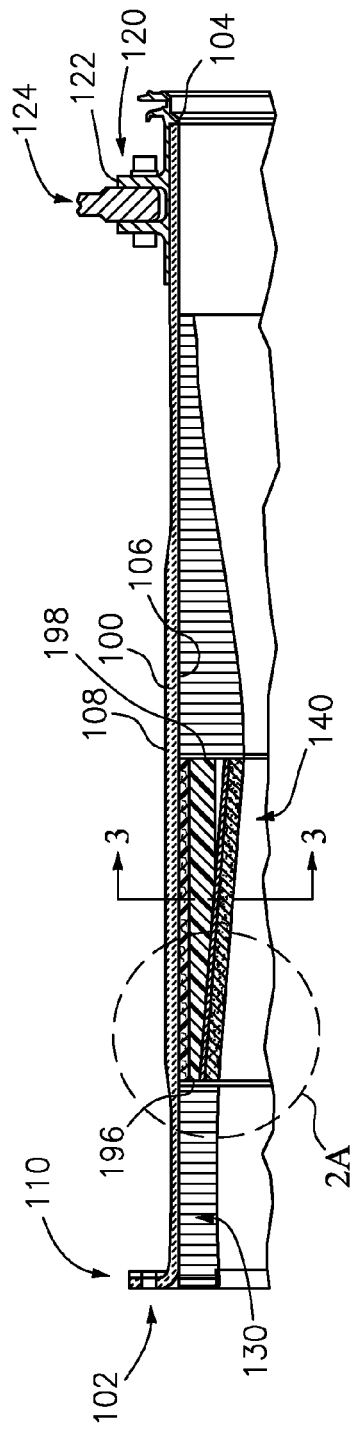
FIG. 2 is an axial sectional view of a fan case of the engine of FIG. 1.
Figure 3A:
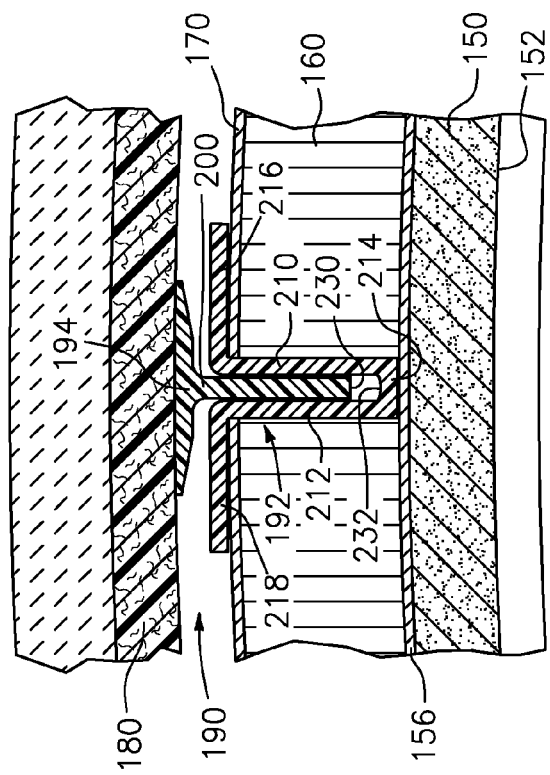
FIG. 3A is an enlarged view of an upper portion of the fan case of FIG. 3.
Figure 3:
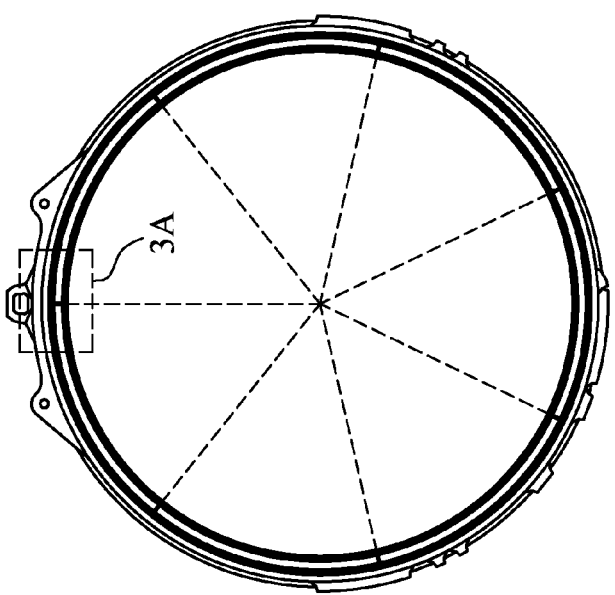
FIG. 3 is a transverse sectional view of the fan case, taken along line 3-3.
Figure 2A:
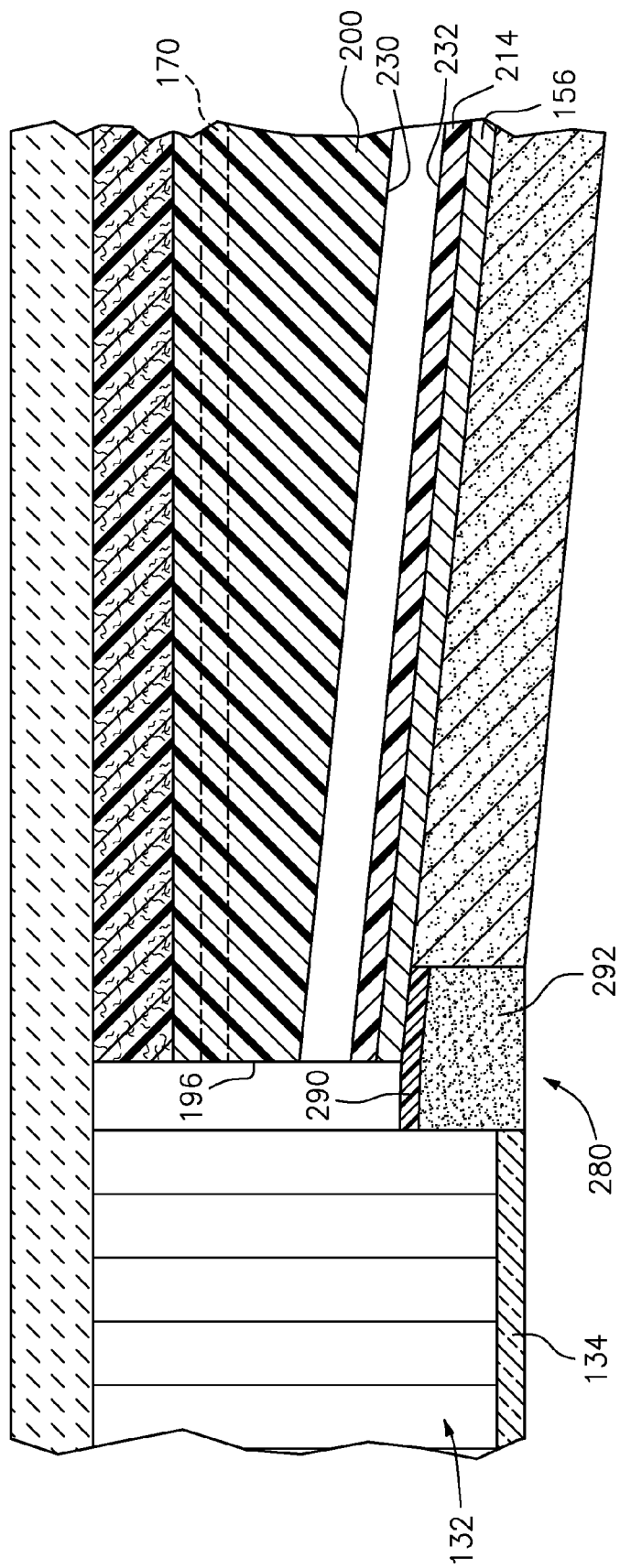
FIG. 2A is an enlarged view of a portion of the fan case of FIG. 2.

FIG. 2 shows further details of the fan case. In the fan case includes a structural member/case comprising a containment case 100. The exemplary containment case is formed as a composite (e.g., carbon fiber and epoxy resin). The exemplary containment case is a full circumference/hoop structure. The exemplary containment case extends from an upstream rim/end 102 to a downstream rim/end 104. The containment case 100 has an inner/inboard surface 106 and an outer/outboard surface 108. Proximate the upstream end 102, the containment case has a radially outwardly projecting flange 110. The fan case further includes a mounting ring structure 120 mounted to and encircling a downstream end portion of the containment case. The mounting ring structure may be formed of metal (e.g., titanium or aluminum) and may have a clevis or other mounting structure 122 for mounting to a forward engine amount of the pylon (e.g. via a mounting lug 124). From upstream-to-downstream, structures are mounted to the inboard surface 106 to define locally the outboard boundary of the core flowpath. Proximate the upstream end 102, is a forward acoustic liner 130. This may be formed of a honeycomb (e.g., a potted honeycomb 132 (e.g., aluminum alloy) having a liner 134 (e.g., fiberglass) (FIG. 2A). The liner and honeycomb may be bonded via adhesive (e.g., an epoxy also bonding the honeycomb to the surface 106).

Downstream/aft of the forward acoustic liner 130 is an abradable liner assembly 140. The liner assembly 140 includes an abradable rub material 150 (e.g., filled epoxy with aramid honeycomb) having an inboard surface 152 in close facing proximity to the fan blade tips. The outboard surface of the abradable rub material is mounted to the inboard surface of an aluminum septum 156. The exemplary aluminum alloy septum 156 is essentially full annulus (either continuous as a single piece or as attached segments, optionally with limited holes, so as to thus be the primary driver of thermal contraction of the liner). The aluminum septum 156 forms an inboard liner of a circumferentially segmented wedge honeycomb sandwich structure 160. Along an outboard boundary of the honeycomb 160, it may bear a similarly segmented aluminum alloy liner/layer 170. The honeycomb 160 is a wedge in that its radial span or thickness increases from upstream to downstream to provide local convergence of the surface 152.

Figure 4:
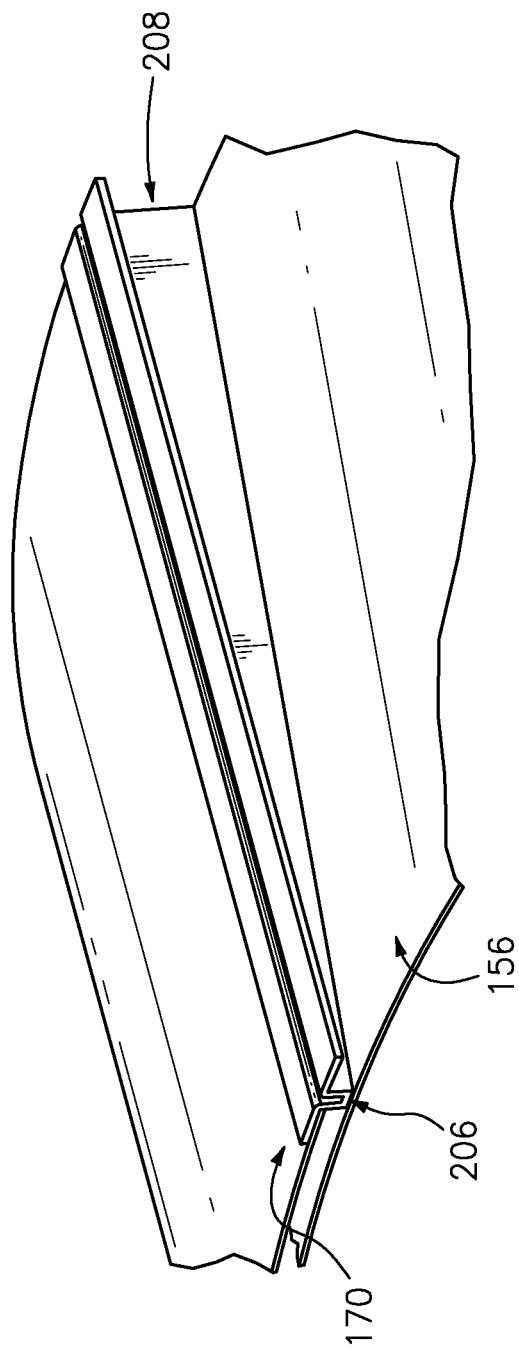
FIG. 4 is a view of a channel of a mounting system in the fan case.

Essentially longitudinally coextensive with the wedge honeycomb and abradable rub material, a ballistic liner 180 may also be provided and secured with its outboard surface along the inboard surface 106 of the containment case. The exemplary ballistic liner comprises a plurality of aramid plies and epoxy resin. It may be pre-cured and secondarily bonded or co-cured with the composite containment case. Anti-rotation features (discussed below) may be bonded to the inner surface of this liner or forward or aft directly to the fan case. The exemplary anti-rotation features are formed by a radially compliant/accommodating attachment system comprises a circumferential array of pairs 190 of channel members 192 and tongue members 194. Each tongue is accommodated in an associated said channel. The exemplary tongue members 194 are T-sectioned, extending from an upstream/forward end 196 to a downstream/aft end 198, with a leg 200 of the T forming the tongue and the arms or head of the T forming a flange. The exemplary flange is mounted to the structural case (e.g., indirectly via having its outboard face bonded to the inboard surface of the ballistic liner). The exemplary flange is metallic (e.g. an aluminum alloy). The exemplary channel member 192 is nonmetallic (e.g. an injection or compression molded plastic such as compression molded plastic such as a glass filled polyether imide). The exemplary channel member extends from an upstream/forward end 206 (FIG. 4) to a downstream/aft end 208. The exemplary channel member 192 has a channel portion comprising a pair of sidewalls 210, 212 extending radially outwards from opposite sides of a channel base 214. The channel member further includes a pair of mounting flange is or rails 216, 218 extending circumferentially outward from radially outboard edges of the respective sidewalls 210 and 212. The exemplary channels extend longitudinally between adjacent circumferential segments of the wedge honeycomb 160. The exemplary channels extend from an upstream end to a downstream end and are essentially longitudinally coextensive with the abradable rub material 150. The exemplary channels deepen from the upstream end to the downstream end to correspond to the thickness increase of the wedge honeycomb. The exemplary tongue members are also essentially longitudinally coextensive with the abradable rub material and channel members. Alternative implementations may longitudinally segment these fully or partially. The exemplary tongues 200 also deepen or increase in radial span from upstream to downstream. This exemplary increase extends along only a forward/upstream portion of the tongue eventually reaching a constant radial span along a downstream portion. This may help save weight.

An exemplary number of tongue/channel pairs is 4-10, more narrowly, 5-8, with an exemplary seven shown. Each tongue 200 has an inboard rim/edge 230 which, in a neutral condition, may be radially spaced apart from the adjacent outboard face 232 of the channel base 214. The exemplary tongue has a pair of generally flat and parallel lateral/circumferential faces closely facing or in sliding engagement with adjacent inboard faces of the respective sidewalls 210 and 212. This close accommodation maintains concentricity of the liner and containment case while allowing for differential thermal expansion. In this example, thermal expansion properties of the containment case are dictated by the coefficient of thermal expansion of its non-metallic material (e.g., fiber composite); whereas thermal expansion properties of the liner assembly are dictated by the coefficient of thermal expansion (CTE) of its metallic material (i.e. the CTE of the septum 156). Different combinations of fan materials, fan structural case materials, and liner materials may influence the relative directions of thermal expansion difference to be accommodated.

Exemplary tongue depth (radial height of the leg of the T) is 20-50 mm (more narrowly 30-45 mm) at exemplary local locations and average over the axial length of the tongue. Exemplary axial length of the tongue is 150-300 mm, more narrowly 200-250 mm or, more broadly, 100-400 mm. Exemplary tongue thickness is 2-10 mm, more narrowly 3-5 mm. Exemplary channel axial length and thickness (interior width) are similar to tongue length and thickness. Exemplary tongue depth (radial height of the leg of the T) is 25-75 mm (more narrowly 50-60 mm) at exemplary local locations and average over the axial length of the tongue.

In an exemplary implementation, the fan blades and its hub (collectively fan) are made of metal (e.g., an aluminum alloy or a titanium alloy). The fan containment case is formed of a much lower CTE material. The liner structural material (forming the driver of its thermal expansion/contraction) may have a CTE closer to that of the fan blades (e.g., within 5% of the CTE of the fan blades, more broadly, within 7%). In the exemplary embodiment, the fan blades are made from aluminum and the structural components of the liner are made from aluminum. Take-off conditions may result in hot temperatures (e.g., ~120 F (~50 C)). The liner will expand circumferentially. Because of the anti-rotation features, the liner is forced to expand radially outward. The fan blades will also grow radially by a similar amount because of the similar materials. At cruise conditions, fan temperatures are very low (e.g., −65 F (~−50 C) or so). The liner will tend to shrink because of the cold temperatures. The anti-rotation features force the liner to move inward radially as the hoop contracts. The fan blades will also shrink because of the cold temperatures by a similar amount. In this way, a passive clearance system can be created which essentially eliminates any negative thermal effects on clearance.

FIG. 2A further shows a sealing system 280 at the upstream end of the abradable rub material. This includes a flash breaker tape 290 or the like having a downstream portion secured along an upstream end portion of the inboard face of the septum 156. A filler 292 (e.g., a polysulfide paste) may be formed alone the inboard base of the tape to 90 to fill the gap between the abradable rub material and the forward acoustic liner 130.

For any upward-facing channel, the taper allows for drainage of any accumulated water.

In manufacture, the various liner components may be assembled with wet epoxy and vacuum bag autoclaved as a unit to cure.

Among further variations would be to replace the T-sectioned tongues with L-sectioned tongues. Among the possible variations in tongue and channel materials are other thermoplastics, thermosets, or lightweight metallic materials with particular embodiments involving a metallic material interacting with a non-metallic material and others involving two non-metallic materials. Coated metals may also be used.

One or more embodiments have been described. Nevertheless, it will be understood that various modifications may be made. For example, when implemented in the redesign/re-engineering of a baseline engine configuration or remanufacturing of such an engine, details of the baseline will influence details of any particular implementation. Accordingly, other embodiments are within the scope of the following claims.

What is claimed is:
1. A turbine engine fan case assembly comprising:
a structural case;
a liner assembly; and
a radially accommodating attachment system connecting the liner assembly to the structural case and comprising:
a circumferentially-distributed plurality of longitudinally elongate radially outwardly open channels mounted to the liner assembly; and
an associated plurality of inwardly-projecting tongues mounted to the structural case, each tongue accommodated in an associated said channel, wherein:
the tongues are of tongue members each comprising a T-sectioned rail, the arms of the T forming a flange mounted to the structural case, and the leg of the T forming the tongue; and
the channels are each formed by a respective member having, in cross-section, a channel base, a pair of sidewalls extending radially outward from opposite sides of the base and a pair of mounting flanges extending circumferentially outward from radially outboard edges of the sidewalls.
2. The fan case assembly of claim 1 wherein:
each T-sectioned rail is a non-metallic rail; and
each said respective member is a non-metallic member.
3. The fan case assembly of claim 2 wherein:
each non-metallic rail comprises injection molded thermoplastic; and
each non-metallic member comprises injection molded thermoplastic.
4. The fan case assembly of claim 1 wherein:
the channels extend within a honeycomb material.
5. The fan case assembly of claim 1 wherein:
there are 4-10 of said channels and tongues.
6. The fan case assembly of claim 1 wherein:
the channels have a fore-to-aft depth increase.
7. The fan case assembly of claim 1 wherein:
the tongues are a molded or extruded plastic; and
the channels are a molded or extruded plastic.
8. The fan case assembly of claim 1 wherein:
the structural case comprises a non-metallic member principally dictating thermal expansion of the structural case; and
the liner assembly comprises a metallic member principally dictating thermal expansion of the liner assembly.
9. The fan case assembly of claim 8 wherein:
the non-metallic member comprises a carbon fiber member.
10. A turbine engine comprising:
the fan case assembly of claim 1; and
a fan, encircled by the fan case.

11. The engine of claim 10 wherein:

the structural case comprises a non-metallic member principally dictating thermal expansion of the structural case;

the liner assembly comprises a metallic member principally dictating thermal expansion of the liner assembly; and the liner assembly metallic member has a coefficient of thermal expansion within 5% of a coefficient of thermal expansion of blades of the fan.

12. The engine of claim 10 wherein:

the fan has metallic blades;

the structural case comprises a non-metallic member principally dictating thermal expansion of the structural case; and the liner assembly comprises a metallic member principally dictating thermal expansion of the liner assembly.

\* \* \* \* \*